United States Patent [19]
McLean

[11] 3,988,169
[45] Oct. 26, 1976

[54] METHOD OF MOLDING CONNECTORS IN ELECTRICAL ACCUMULATORS

[75] Inventor: Thomas Fraser McLean, Sylvania Heights, Australia

[73] Assignee: Chloride Batteries Australia Limited, Australia

[22] Filed: Sept. 12, 1974

[21] Appl. No.: 505,309

[30] Foreign Application Priority Data
Sept. 12, 1973 Australia.................... 4818/73

[52] U.S. Cl............................ 29/623.1; 164/DIG. 1
[51] Int. Cl.²........................................ H01M 2/26
[58] Field of Search............ 136/134 R, 135 S, 168, 136/176; 164/DIG. 1

[56] References Cited
UNITED STATES PATENTS

| | | | |
|---|---|---|---|
| 1,907,420 | 5/1933 | Finn | 136/134 R |
| 3,579,386 | 5/1971 | Tiegel et al. | 136/134 R |
| 3,703,589 | 11/1972 | Rigsby | 136/134 R |
| 3,791,874 | 2/1974 | Port | 136/134 R |
| 3,841,915 | 10/1974 | Eberle | 136/134 R |

FOREIGN PATENTS OR APPLICATIONS

| | | | |
|---|---|---|---|
| 2,056,054 | 5/1971 | Germany | 136/134 R |
| 1,378 | 3/1967 | Japan | 136/134 R |

Primary Examiner—Donald L. Walton
Attorney, Agent, or Firm—Watson Cole Grindle & Watson

[57] ABSTRACT

The present invention relates to the construction of multi-cell batteries in which bus bars are cast within the battery containers to provide interconnection of groups of plates in each cell. Further the batteries may be provided with inter-cell and terminal connectors integrally cast with the bus bars and removable or permanent tooling is illustrated in suitably adapted form for casting of such bus bars and connectors in one operation.

9 Claims, 8 Drawing Figures

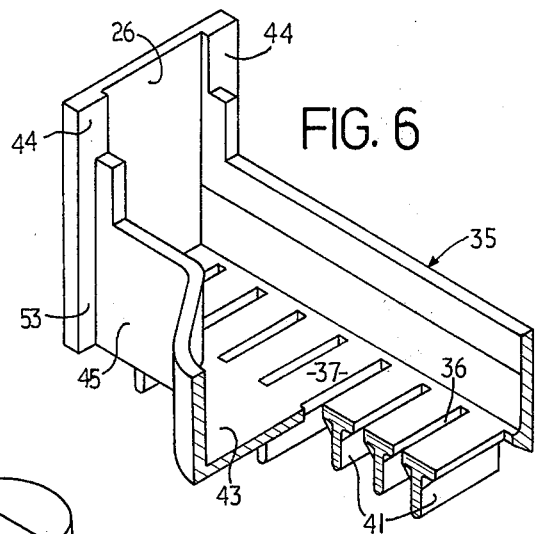
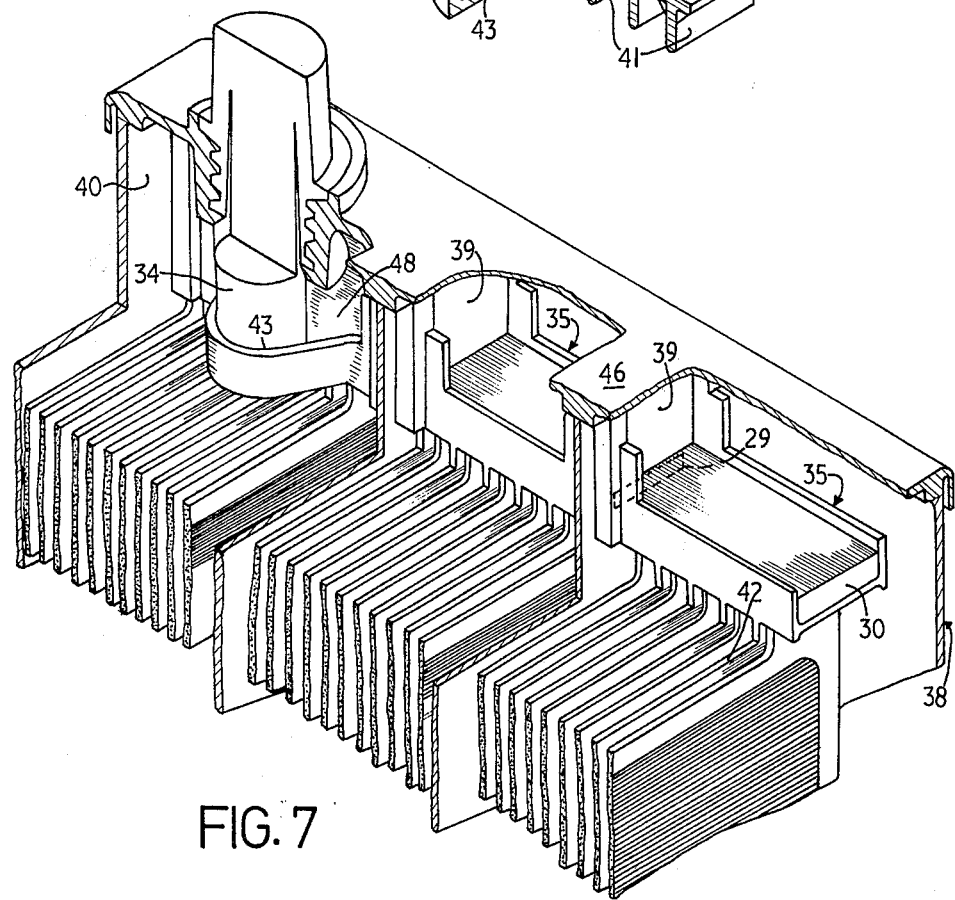

METHOD OF MOLDING CONNECTORS IN ELECTRICAL ACCUMULATORS

The present invention relates to plate assemblies for multi-cell batteries or accumulators of the type comprising a plurality of side-by-side alternate positive and negative plates and respective bus bar and inter-cell connectors electrically coupling plates of like polarity.

In conventional manufacture and assembly of batteries of the type having a number of cells each housing a group of plates, each group of plates is first built-up externally of the battery container by interleaving alternate positive and negative plates with separators therebetween. Each plate is provided with an integral lug to facilitate interconnection of like polarity plates. The groups of interleaved plates are placed in and held by, what is known in the art as, a "group burning machine". Such machines include tooling to hold in alignment the groups of spaced plates and to form a trough adjacent the plates of like polarity in each group. The troughs are adapted and the plate lugs are positioned so that the lugs extend into the troughs for interconnection. Where inter-cell or terminal connections are required, preformed inter-cell or terminal connectors are positioned adjacent to the groups as required with a toed portion thereof extending into the appropriate trough or troughs.

The plates of like polarity and connectors in each group are then interconnected by application of heat to melt a portion of the plate lugs and connectors, which protrude into the troughs, and by supplying additional molten lead into the troughs to form a bus bar in each trough.

Accordingly the lead bus bars connect like polarity plates together in each group in addition to providing anchoring for take-off connectors, for example an inter-cell connector or terminal posts.

On solidification of the bus bars formed in the conventional group burning machine, the tooling forming the troughs is removed and the groups of connected plates are then withdrawn from the machine and subsequently placed into their respective cells in a container of polypropylene, rubber or any other suitable material. Adjacent inter-cell connectors are then resistance welded together through a hole previously formed in the container dividing partitions.

Problems have been experienced of premature failure of the battery elements, which have been fabricated by the abovementioned conventional manufacturing process, and in particular failure of the resistance welded inter-cell connectors. Further the handling of the groups of interconnected plates from the group burning machines and their assembly into the container cells is undesirable and can contribute to such failures during normal use. Also such processes are costly and time consuming.

An object of the present invention is to provide an electrical battery substantially free of the above defects.

Another object of the present invention is to provide an improved method of manufacturing and assembling electrical batteries.

Accordingly the present invention in one general form is a method of assembling an electrical battery comprising the steps of:

a. providing a container having at least one partition wall to form at least two cells therein, b. providing an aperture in the partition wall as required for inter-cell connection, c. placing a group of plates into each cell, each group of plates having at least one plate of positive polarity and at least one plate of negative polarity, d. forming a channel adjacent the plates of like polarity in each group of plates, a part of each plate of like polarity being exposed in its respective channel, and e. flowing molten metal in the channels to join said parts of like polarity in each cell and through the aperture in the partition wall to form an inter-cell connector.

The present invention in another general form is an electrical battery comprising:

a. a container having at least one partition wall to form at least two cells therein, b. a group of plates in each cell, each group of plates having at least one plate of positive polarity and at least one plate of negative polarity, c. a cast bus bar connecting a part of each plate of like polarity in each group, d. one or more apertures in each of the partition walls as required for inter-cell connection, and e. one or more inter-cell connectors as required for connecting each cell to an adjacent cell through the apertures in the partition walls, the inter-cell connectors being integrally cast with the bus bars.

The assembly method according to the present invention permits placement of the plates into their respective cells prior to their interconnection and subsequently allows simultaneous interconnection of the plates and forming of inter-cell connectors between adjacent cells which are separated by a partition wall, by flowing molten lead or lead alloy through an aperture in the partition wall between the cells. The assembly method eliminates the conventional "burning up" of a group of plates in the group burning machines as a separate operation, anchoring the inter-cell connectors and welding together of such conventional inter-cell connectors. There is consequently a reduction in the handling required, which in turn results in a lower reject rate.

Further, the assembly method may be utilised when battery containers of both hard rubber and thermoplastics material are used. However, when rubber containers are used, it is preferable that, in order to provide good sealing of the inter-cell connectors in their respective partition wall apertures, the cast bus bars immediately on either side of the aperture are provided with flanged portions and that upon cooling of the cast bus bars, the contraction of the metal causes the bus bars on either side of the partition to form a seal therewith.

Preferably the channel, which is provided to contain the molten lead around the plate lugs, may be formed by either removable or permanent tooling. The removable tooling is preferably made of metal and is positioned in each cell compartment to form a trough into which the molten lead is poured. This tooling is subsequently removed when the molten lead has solidified. However, when permanent or fixed tooling is used this fixed tooling remains in the battery after pouring of the lead. One form of permanent tooling may be a plastic trough into which a part of each plate or lug protrudes prior to accepting the molten lead. Further, the aperture in the partition between adjacent cell compartments need not be circular and may be rectangular or bell-mouthed or in any shape as required.

Further the present invention in another general form is an electrical battery comprising:

a. a container having at least one cell therein, b. a group of plates in each cell, each group of plates having at least one plate of positive polarity and at least one plate of negative polarity, c. a permanent channel member which is located adjacent the plates of like polarity in the group, a part of each plate of like polarity being exposed in the channel member, and d. a cast bus bar which is formed within the channel member interconnecting said parts of like polarity.

Also the present invention in yet another general form resides in a method of assembling an electrical battery comprising the steps of:

a. providing a container having at least one cell therein, b. placing a group of plates in each cell, each group of plates having at least one plate of positive polarity and at least one plate of negative polarity, c. forming a permanent channel member which is located adjacent the plates of like polarity in the group, a part of each plate of like polarity being exposed in the channel member, and d. flowing molten metal in the channel member to join said parts of like polarity in each cell.

Some preferred embodiments of the present invention will now be described by way of example with reference to the accompanying drawings, wherein:

FIG. 6 is a perspective view in part section of permanent trough tooling which is adapted to include for terminal post interconnection;

Figure 5:
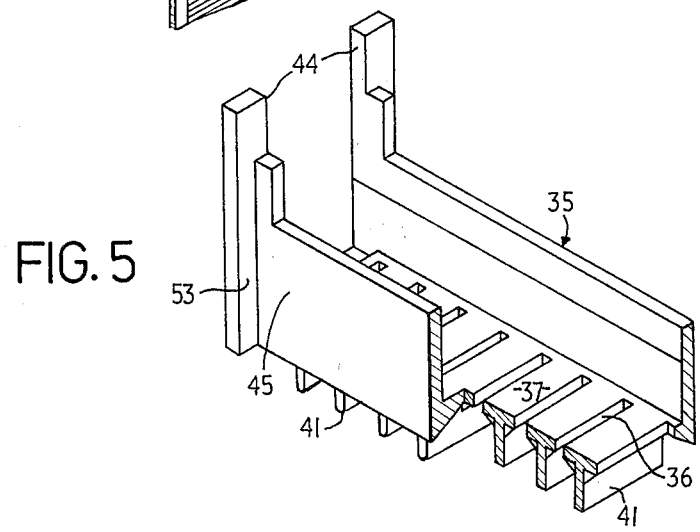
FIG. 5 is a perspective view in part section of permanent trough tooling in the form of a channel of plastics material.
Figure 8:
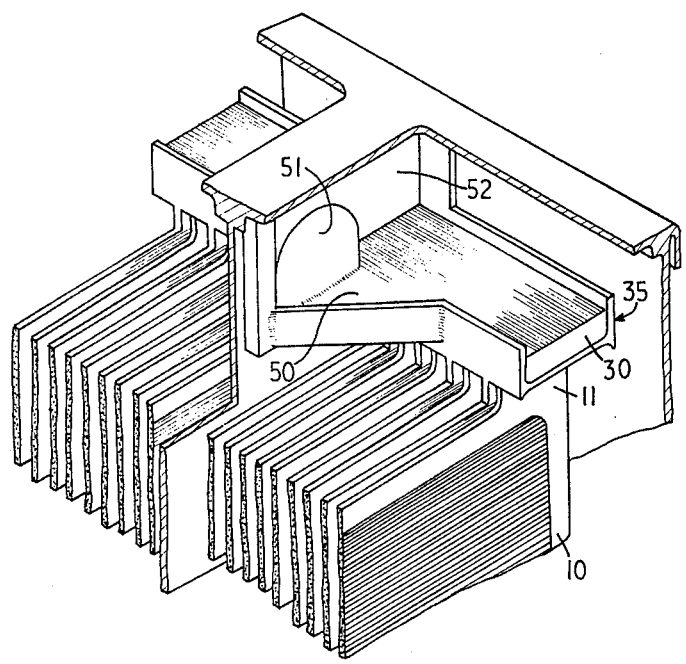

FIG. 7 shows a battery assembly in which permanent tooling of the type illustrated in FIGS. 5 and 6 is incorporated to provide for interconnection of plates and terminal posts and inter-cell connection of adjoining cells by pouring of molten metal along the troughs and through partition walls; and FIG. 8 illustrates permanent trough tooling adapted to provide for an alternative form of inter-cell connector which may be simultaneously connected to the plates during casting of the bus bar.

Figure 1:
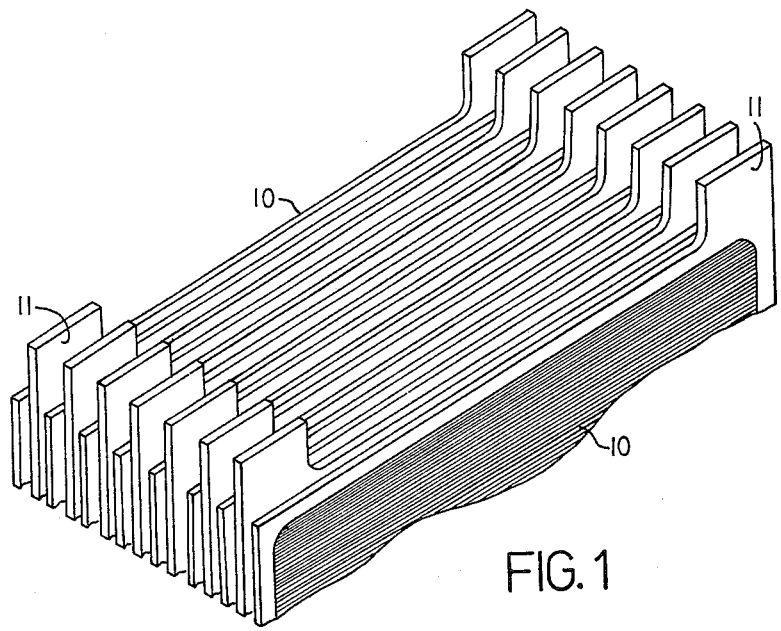
FIG. 1 illustrates a number of battery plates built-up for insertion in either a group burning machine or into a cell cavity in a container.

In FIG. 1 a number or group of interleaving and alternate positive and negative rectangular plates 10 are aligned in spaced relationship and are provided with separators therebetween. Each plate includes an upwardly extending lug 11 which is integrally formed therewith and located at a top corner of the rectangular plate. The lugs 11 of like polarity plates are aligned in a suitable manner for interconnection. The group of plates are then inserted into a container of suitable plastics or rubber material, the container having a number of cells which are separated by partition walls and each cell containing at least one group of plates. Those skilled in the art will appreciate that the container may be adapted to form a jig into which the individual plates may be placed prior to interconnection, the container providing the means for maintaining the plates in the required spaced relationship with each other.

Figure 3:
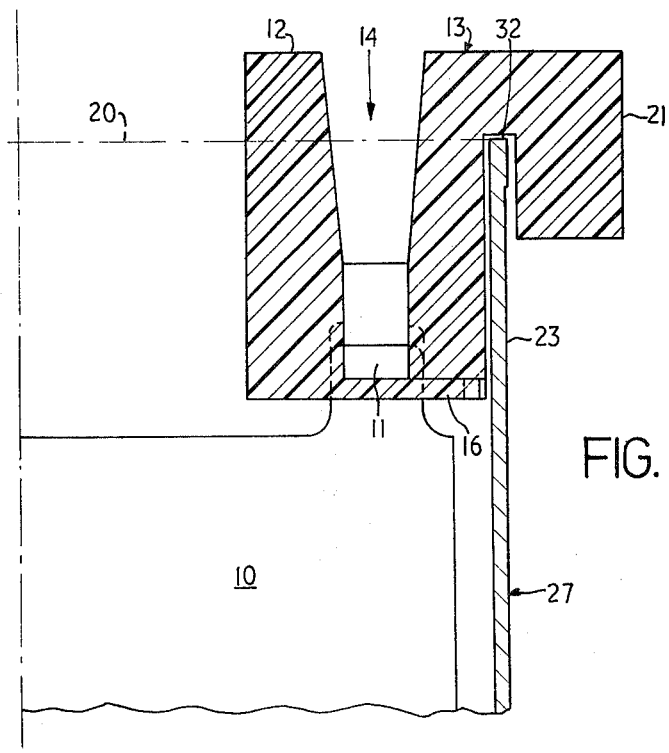
FIG. 3 is a sectional view of the removable trough tooling which is illustrated in FIG. 2, the tooling being located in a container and in a position prior to pouring of molten metal.
Figure 2:
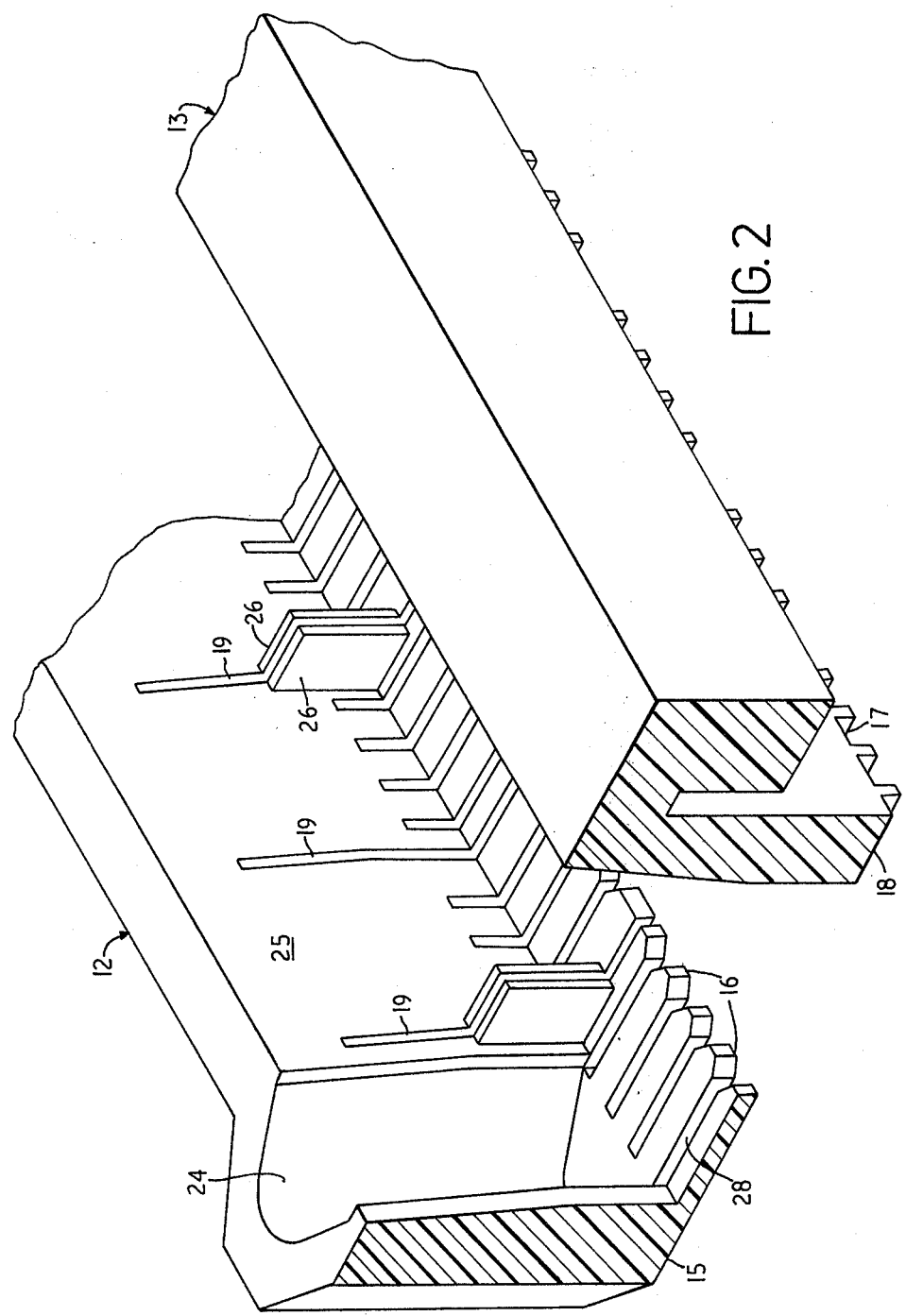
FIG. 2 is a perspective view in part section of removable trough tooling, into which molten metal is poured to provide plate and inter-cell connection by casting of a bus bar.

Considering first the interconnection and formation of a bus bar by the use of removable tooling, FIGS. 2 and 3 show a pair of mold parts 12 and 13 which cooperate to form an elongate channel or trough 14 and which parts are provided with guides (not shown) to maintain the parts in alignment. One mold or moving part 12 of the removable tooling at and along the base 15 thereof is provided with a plurality of fingers 16 which extend across the base of the trough to engage in corresponding slots 17 in the base 18 of the other mold or fixed part 13 of the removable tooling. The spacing between the fingers is sized to receive the lugs 11 of plates requiring interconnection. Further, slots 19 are provided along the mold parts 12 and 13 to receive the partition walls 20 between adjacent cells and to allow the mold parts to be placed within the cell cavity and locate on the plate lugs 11, as shown in FIG. 3. As illustrated in FIGS. 2 and 3, the fixed part 13 of the mold tooling is provided with a hooked portion 21 which enables the fixed part 13 to be supported on a top edge 22 of one container side wall 23 and acts as a means of gauging the depth position of the trough formed by the two parts. It will be noted that the mould parts may include a cavity 24 which is sized to receive a toed preformed terminal post or connector, as shown for exemplary purposes in one side 25 of the moving part 12 of the removable trough tooling. Also the trough tooling may include blanking elements 26 in the bus bar channel 14 to locate on opposing sides of a partition wall when an intercell connection is not required. Such blanking elements 26 protect the partition wall against deformation by the molten metal and ensure where required that inter-cell connection does not occur.

In manufacture of batteries using removable tooling of the type described above, the mold parts 12 and 13 are placed in the battery container 27 such that the lugs 11 of each group of like polarity plates in each cell, as required for interconnection, protrude through the spaces 28 between the mold fingers 16 into the trough. Where inter-cell connection is required between any two adjacent cells, an aperture 29 is formed in the partition wall 20 therebetween and is positioned in alignment with the trough. Molten lead is then poured into the trough 14 and onto exposed portions of the plate lugs that extend into the trough to form a cast bus bar 30. The molten lead is also caused to flow through the apertures 29 in the partition walls 20 between adjacent cells to form an inter-cell connector 31 between bus bars of adjacent cells and thus connecting a group of plates in one cell to a group of plates in an adjacent cell in one operation.

Figure 4:
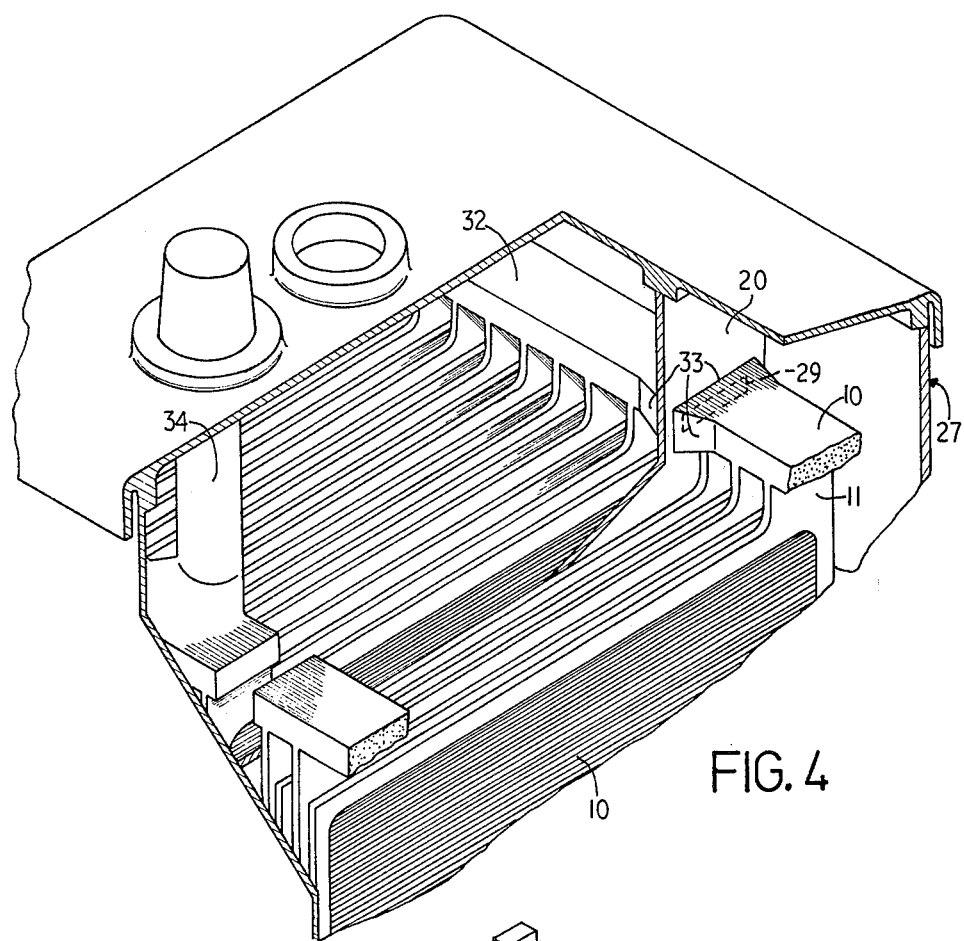
FIG. 4 is a view in perspective of a completed battery assembly in part broken section showing a lead bus bar formed to provide inter-cell connection of adjoining cells, the removable tooling required to assist with the forming of the bus bar having been removed.

As illustrated in FIG. 4, bars 30 and 32 are provided with thickened or flanged portions 33 which are located adjacent to and on both sides of partition wall 20, the cross-sectional area of the apertures 29 being substantially less than that of the thickened portions 33 such that the molten lead on solidification will firmly secure and anchor the bus bars to the partition wall. Solidification of the bus bars, will tend to cause a contraction of the bus bars on each side to create a substantially leak-proof seal between the cells. Connection of plate lugs 11 to terminal posts or connectors 34 may be achieved during the pouring of the molten lead into the trough by provision of mold cavities of the type 24 shown in FIG. 2 and any suitable means of holding the posts 34 during the pouring operation.

Referring now to an alternative form of tooling namely, permanent or fixed tooling, for providing a channel into which molten lead may be poured to form a cast bus bar on solidification thereof, such permanent tooling is shown in FIGS. 5 and 6 as a trough 35 of plastics or rubber material. The plastic trough 35 has arranged in spaced relationship to correspond with that of the plate lugs 11, a number of plate lug slots 36 in the base 37 thereof and as illustrated in FIG. 7 a plurality of such troughs 35 are placed in the container 38, each trough extending between opposing walls 39 or 40 of each cell. The plate lugs 11 extend upwardly through the slots 36 into the plastic troughs and are exposed to the molten lead during subsequent pouring of the metal. In similar manner to that described with reference to removable tooling the partition walls 39 are formed with apertures 29 as required for cell interconnection and the apertures 29 are aligned to allow flow of molten metal from one plastic trough in one cell to another trough in an adjacent cell as required. In similar manner to the case of removable tooling, solidification of the bus bars causes an engagement of the bus bars with the partitions. Thus in the case of both removable and permanent tooling and where the cross-sectional area of the aperture is less than that of the bus bars immediately adjacent the partition wall, cooling of the bus bar may cause increased contact pressure between the wall and the bus bars.

Each permanent or fixed trough 35 is provided with members 41 which extend from the base of the trough, each member 41 resting on or locking with a top edge 42 of a plate of opposite polarity with respect to adjacent plate lugs 11 which protrude into the trough. The members 42 provide additional support for the plate which is now anchored at both ends against vibration; that is, one end of the plate is anchored by attachment of the plate's lug to one bus bar and the other end restrained by the members protruding from the plastic trough containing the other bus bar of opposite polarity. Such anti-vibration members 41 avoid the need for additional securing of plates to the bottom of the container 38 as in conventional batteries. Where terminal posts 34 are required such as shown in FIG. 7, the permanent trough 35 is similarly adapted to include a cavity 43, as illustrated in FIG. 6, into which a previously molded toed post is placed during the pouring of molten lead to form cast bus bar 48. Further as shown in FIG. 6, the permanent trough may be provided as required with blanking elements 26 to prevent exposure of the container partition and outside walls to the molten metal during casting.

In light of the foregoing, those skilled in the art will appreciate that the removable and permanent tooling may be adapted to include one or more molds in which terminal posts and connectors may be cast. The inclusion of such connector molds thus allows casting of the bus bars and connectors in one operation and, in particular, allows casting of the terminal connectors through an outer wall of the container. Further both the removable and permanent tooling may be shaped to produce any form of thickened or flanged portion 33 at ends of the bus bar 30 in each cell. The permanent trough tooling 35 is illustrated for convenience only without such thickened portions 33.

Referring to FIGS. 5 and 6, it is preferable that the plastic trough 35 or fixed tooling is secured to the container 38 independent of contact with the cast bus bar 30 in order to provide additional support for the plates 10 within the battery container and to enable the plates to withstand vibration and other mechanical forces experienced under normal working conditions. Securement of the trough may be achieved by provision of flanges 53 having riser members 44 which are integrally formed with the channel section 45 of the trough at each end thereof, as illustrated in FIGS. 5 and 6. The riser members 44 preferably extend upwardly from the trough to permit engagement with the battery container cover 46 during the sealing of the cover to the side walls 40 and partition walls 39 of the container. Alternatively the riser members 44 may be integrally formed with the channel at any suitable position along its length. Further the trough 35 may be secured to the partition and end walls of the container by any suitable means such as, for example, adhesives, heat welding and ultrasonic welding. It will be noted that the melting point of molten lead is approximately 420° C which is substantially higher than that of plastics material. Consequently some deformation of the permanent plastics trough 35 may be experienced. However, contrary to that would normally be expected the trough 35 retains its general channel-shaped configuration for sufficient time to allow the molten lead to solidify and to thus become self-supporting. The permanent trough on return to normal temperature hardens and contributes to the support of the bus bar 30 and plates 10 attached thereto.

An electrical battery fabricated by the above means provides and offers a wide scope for achieving economies in battery assembly costs together with providing a means of connecting adjacent elements together through the dividing partition wall without resort to resistance welding techniques.

Those skilled in the art will appreciate that the permanent plastics trough may be adapted as shown in FIG. 8 to include a cavity 50 similar to those (24 and 43) illustrated in FIGS. 2, 6 and 7 which cavity 50 is sized to receive a previously formed toed inter-cell connector part 51. Connector parts 51 may be held in position within cavity 50 and adjacent an aperture in the partition wall 52 in a similar manner as required for terminal posts 34 during pouring of molten lead. The molten lead on solidification thus provides interconnection between the plate lugs 11 and inter-cell connector parts 51, each of which is subsequently welded by any suitable conventional means to its corresponding connector part in an adjacent cell.

Similarly additional tooling may be provided to form one or more molds in which the connector parts and terminal connector as required may be cast, thus enabling casting of the bus bars, inter-cell connector parts and terminal connectors in one operation.

What I claim is:

1. A method of assembling an electrical battery comprising the steps of:

a. providing a container having at least one partition wall to form at least two cell therein, b. providing an aperture in said cell at least one partition wall as required for inter-cell connection, c. placing a group of plates into each cell, each group of plates having at least one plate of positive polarity and at least one plate of negative polarity.

d. forming a channel mold adjacent the plates of like polarity in each group of plates, a part of each plate of like polarity being exposed in its respective channel, e. flowing molten metal only in the channels with the battery container in an upright position to join said parts of like polarity in each cell and through the aperture in the partition wall to form an inter-cell connector; and f. removing the mold subsequent to the soldification of the molten metal.

2. A method as claimed in claim 1 wherein the molten metal is premelted and poured into the channels.

3. A method as claimed in claim 1 wherein the molten metal is provided by melting the metal insitu.

4. A method as claimed in claim 1, further comprising the steps of providing at least one opening in at least one outer wall of the container, locating a terminal connector mold adjacent said at least one opening and forming the bus bars, inter-cell connectors and terminal connectors in one operation.

5. A method as in claim 1 further comprising the step of blanking said channel member at predetermined locations to prevent flow of the molten metal in the bus bar channel.

6. A method as in claim 1 wherein the cross-section of the aperture in said at least one partition wall is less than the cross-section of the channel adjacent the partition whereby contraction of the bus bars on cooling causes increased contact pressure between the bus bars and the partition wall.

7. A method as in claim 1 wherein said channel adjacent the plates of a like polarity in each group of plates comprises a removable tool including a fixed and movable mold part wherein the fixed mold part includes means for supporting itself on an edge wall of the battery container and slots in the base thereof mating with fingers on the movable portion of the mold fixture of the removable tooling to form spaces therebetween to receive the lugs of the plates and wherein the step of forming the channel includes the steps of suspending the fixed mold portion on the edge of the battery container with the lugs of the plates protruding into and above said spaces.

8. A method as in claim 7 wherein the movable mold portion further includes slots and the step of forming the channel further includes the step of placing at least one of the slots over at least one partition wall thereby aligning the removable tool on said battery container.

9. A method of casting in an upright position a combined inter-cell connector and plate strap having a portion passing through an opening in an inter-cell partition between two cells of a multi-cell electrical battery, comprising the steps of:

a. assembling battery elements with upstanding plate lugs in said two cells;

b. applying to opposite sides of the partition a mold having in each cell a cavity with slots in the floor thereof through which said plate lugs project and which is exposed to the partition surrounding the opening therein, said mold having an outer part and an inner part with said outer part being vertically movable into an operative position with said inner part which is movable both horizontally and vertically;

c. feeding molten metal into the mold to form plate straps with portions engaging opposite faces of the partition and a neck passing through the aperture; and d. removing the mold subsequent to the solidification of the molten metal.

* * * * *